United States Patent [19]

Jensen et al.

[11] Patent Number: 5,605,550
[45] Date of Patent: Feb. 25, 1997

[54] BATTERY LAMINATE WITH IMPROVED ELECTROLYTE AND ANODE OR CATHODE LAYER CHARACTERISTICS

[75] Inventors: Gert L. Jensen, San Jose; Benjamin Chaloner-Gill; Mark J. Isaacson, both of Santa Clara, all of Calif.

[73] Assignee: Valence Technology, Inc., Henderson, Nev.

[21] Appl. No.: 284,311

[22] Filed: Aug. 2, 1994

Related U.S. Application Data

[63] Continuation-in-part of Ser. No. 77,310, Jun. 14, 1993, abandoned.

[51] Int. Cl.$^6$ ........................................ H01M 6/00
[52] U.S. Cl. .............................. 29/623.3; 29/623.1
[58] Field of Search .......................... 29/623.3, 623.1; 429/191, 192, 218, 233, 234

[56] References Cited

U.S. PATENT DOCUMENTS

| | | | |
|---|---|---|---|
| 4,161,815 | 7/1979 | Land et al. | 29/623.3 |
| 4,824,744 | 4/1989 | Kuo et al. | 29/623.3 |
| 4,925,751 | 5/1990 | Shackle et al. | 429/191 |
| 4,935,317 | 6/1990 | Fauteux et al. | 429/192 |
| 4,997,732 | 3/1991 | Austin et al. | 429/153 |
| 5,162,178 | 11/1992 | Ohsawa et al. | 429/218 |
| 5,272,017 | 12/1993 | Swathirajan et al. | 429/192 |
| 5,435,054 | 7/1995 | Tonder et al. | 29/623.1 |

FOREIGN PATENT DOCUMENTS 63-045755  2/1988  Japan.

*Primary Examiner*—Bruce F. Bell
*Attorney, Agent, or Firm*—James Hsue

[57] ABSTRACT

In making a laminar assembly for use in the battery, a layer of battery electrode material is deposited onto a substrate surface and the battery electrode material is caused to have an uneven surface. Then an electrolyte layer is deposited onto the uneven surface of the battery electrode material. Where the method calls for first depositing the electrolyte material, then electrolyte material is deposited onto the substrate layer where the electrolyte layer is caused to have an uneven surface. Thereafter, the battery electrode material is deposited onto the uneven surface of the electrolyte material. In both cases, slippage between the battery electrode material and electrolyte material is reduced during cutting, folding and other handling process in making a laminar battery, thereby reducing the probability of shorts in the battery. In order to form the cathode or electrolyte layer, a pump is used to squeeze a viscous cathode or electrolyte material through a nozzle onto a substrate surface and the viscous material and substrate layer are passed between two pressing surfaces moving in the same direction pressing the viscous material onto the substrate layer. The two pressing surfaces are spaced apart by a predetermined distance so that the viscous material is pressed into a layer with a predetermined thickness with no pin holes therein so that the material adheres to the substrate layer.

17 Claims, 5 Drawing Sheets

BATTERY LAMINATE WITH IMPROVED ELECTROLYTE AND ANODE OR CATHODE LAYER CHARACTERISTICS

CROSS-REFERENCE TO RELATED APPLICATION

This application is a continuation-in-part application of application Ser. No. 08/077,310 entitled "Battery with Improved Adherence between Electrolyte and Anode or Cathode," by Benjamin Chaloner-Gill and Mark J. Isaacson, filed Jun. 14, 1993 now abandoned, herein referred to as the parent application.

BACKGROUND OF THE INVENTION

This invention relates in general to laminar type batteries and, in particular, to a method for making a laminar battery with improved electrolyte and anode or cathode layer characteristics and to laminar batteries made using the process.

Thin layer solid state batteries have been very much in demand. Such batteries have been used in laptop or palmtop computers and other portable devices. The lithium anode type cell is one type of widely used thin layer solid state batteries. These batteries include an anode, a transition metal oxide polymer composite cathode, and a solid or liquid electrolyte which includes a dissolved salt. Where the anode employed is made of lithium, the electrolyte would include a lithium salt. Batteries with anodes made of metals other than lithium, such as magnesium, have also been proposed.

The key objective of the above-described thin layer solid state batteries is to be as thin and compact as possible while remaining acceptable for use in portable devices in terms of the storage capacity, current density, and shelf-life. One example of the above-described batteries and its packaging are described in U.S. Pat. No. 4,997,732 to Austin et al. ("Austin et al."), which is incorporated herein by reference in its entirety.

The anode used in the above-described thin layer batteries is typically in the form of a sheet or foil having a typical thickness of about 25 to 75 microns. The ionically conducting polymeric electrolyte layer may have a typical thickness of about 10 to 75 microns and cathode layer having a typical thickness of about 50 to 150 microns. Current collectors used may have a typical thickness of about 5 to 25 microns.

One of the problems encountered in the manufacturing of the thin layer solid state batteries is that there may be slippage between the electrolyte layer material and the anode or cathode (referred to below as electrode) layer material when the batteries are made and assembled. Such slippage may cause misalignment between the electrolyte layer and an electrode layer, thereby increasing the probability of shorting which results in a defective battery. It is therefore desirable to provide an improved method of assembly whereby such slippage is reduced.

In many laminar batteries, the cathode is formed by a paste material which is deposited onto a current collector. Then an electrolyte material also in the form of a paste is deposited on top of the cathode layer. During the deposition process, pin holes can develop within either the cathode or the electrolyte layer, so that short circuits can develop through the pin holes in the cathode layer or the electrolyte layer. This is undesirable. During the deposition of the cathode layer, if one portion of the layer is much thicker than the surrounding areas with the thicker portion forming a protrusion, then after the electrolyte layer is deposited onto the cathode layer, such protrusion can contact the anode which is to be separated from the cathode by the electrolyte layer, thereby causing short circuit in the battery between the anode and cathode. It is therefore desirable to form the electrolyte and cathode layers without pin holes or protrusions that may cause short circuits.

SUMMARY OF THE INVENTION

This invention is based on the observation that by causing the layer of battery electrode material to have an uneven surface and depositing electrolyte material on the uneven surface of the battery electrode material, adhesion between the battery electrode and electrolyte layers is increased and the probability of misalignment and shorting is thereby reduced. Similarly, if the battery electrode material is to be deposited onto an electrolyte material in the process for making a laminar battery, the layer of electrolyte material is caused to have an uneven surface and the battery electrode material is then deposited on the uneven surface of the electrolyte material to again increase the adhesion between the two layers and to reduce the probability of misalignment and shorting.

One aspect of the invention is directed towards a method for making a laminar battery comprising depositing a layer of battery electrode material on a substrate layer, causing the layer of battery electrode material to have an uneven surface, curing said battery electrode material and depositing a layer of electrolyte material on the uneven surface of the battery electrode material.

Another aspect of the invention is directed towards a laminar assembly for use in the battery which results from the above-described method. The assembly comprises a substrate layer having a substantially flat surface, a battery electrode layer with an uneven surface, said electrode layer being in contact with and extends over the flat surface of the substrate layer, the uneven surface being such that heights of protrusions or depths of depressions in the uneven surface from a reference plane representing the uneven surface is less than about 25% of the average thickness of the battery electrode layer. The assembly further comprises an electrolyte layer on the uneven surface.

Another aspect of the invention is directed towards a method for making a laminar battery comprising depositing a layer of electrolyte material on a substrate layer, causing the layer of electrolyte material to have an uneven surface and depositing a layer of battery electrode material on the uneven surface of the electrolyte material.

Yet another aspect of the invention is directed towards a laminar assembly for use in a battery comprising a substrate layer having a substantially flat surface, an electrolyte layer with an uneven surface, said electrolyte layer being in contact with and extends over the flat surface of the substrate layer, the uneven surface being such that heights of protrusions or depths of depressions in the uneven surface from a reference plane representing the surface is less than about 25% of the average thickness of the electrolyte layer. The assembly further comprises a battery electrode layer on the uneven surface. In the above methods and assemblies, the battery electrode layer can be a cathode layer or an anode layer.

Another aspect of the invention is based on the recognition that, by forcing a viscous battery material such as a battery electrode or electrolyte material through an opening onto a surface of a substrate layer and passing the material and the substrate layer through two pressing surfaces moving in the same direction, the resulting layer of viscous battery material will have no pin holes and would not have protrusions that will cause short circuits in the battery. Therefore, another aspect of the invention is directed towards a method for making a laminar battery assembly, comprising the steps of forcing a viscous battery material through an opening onto a surface of a substrate layer, and passing the viscous material and the substrate layer through two pressing surfaces moving in the same direction, said two pressing surfaces spaced apart by a predetermined distance so that the viscous material is pressed into a layer with a predetermined thickness with substantially no pin holes therein, and so that the material adheres to the substrate surface.

Still another aspect of the invention is directed towards an apparatus for making a laminar battery assembly, comprising a nozzle and means for squeezing a viscous battery material through an opening of the nozzle onto a surface of a substrate layer and two pressing surfaces moving in the same direction pressing the viscous material onto the substrate layer, said two pressing surfaces spaced apart by a predetermined distance so that the viscous material is pressed into a layer with a predetermined thickness with substantially no pin holes therein, and so that the material adheres to the substrate surface.

BRIEF DESCRIPTION OF THE DRAWINGS

For simplicity in description, identical parts are labeled by the same numerals in the different figures of this application.

DETAILED DESCRIPTION OF THE PREFERRED EMBODIMENT

As used herein, the term "battery" may include a single cell, or a plurality of cells, connected in either series or parallel fashion to furnish electrical current. The term "cell" includes an anode layer, cathode layer, electrolyte layer, and a pair of electrically conductive terminals, or a plurality of these layers connected in bi-faced, hi-polar, or other cell configuration designs known to those skilled in the art.

Figure 1:
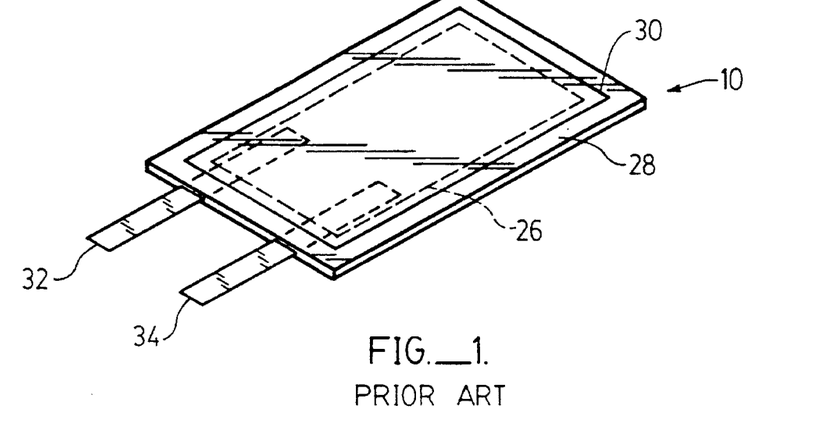
FIG. 1 is a perspective of a battery assembly showing a laminar thin cell battery in phantom enveloped by a heat-sealed sheet material in a conventional design.

The conventional design in FIG. 1 is a battery assembly 10 which includes a thin cell laminar battery 26 shown in phantom, enveloped by a multi-layered air and water occlusive protective sheet film material 28 which is heat-sealed around its periphery 30. Connected to battery 26 are tabs 32 and 34 which are respectively electrically connected to the anode and cathode of battery 26.

Figure 2:
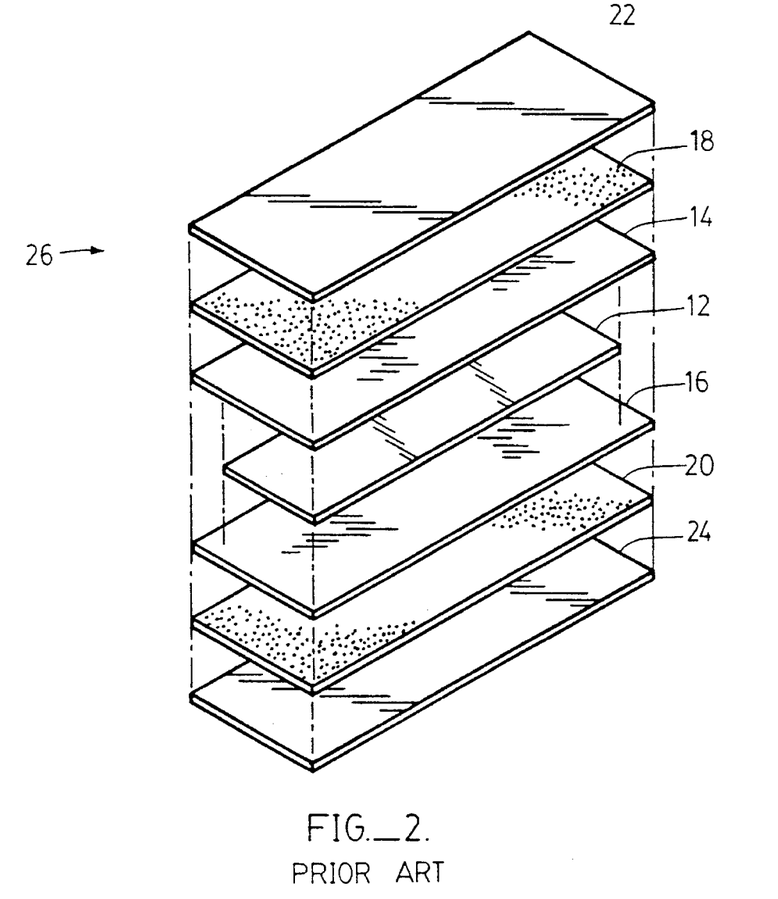
FIG. 2 is an exploded perspective view of the laminar thin cell battery in the assembly of FIG. 1.

FIG. 2 is an exploded perspective view of battery 26 of FIG. 1. As shown in FIG. 2, battery 26 is a laminar cell which includes an anode 12, first and second layers of an ionically conductive electrolyte 14, 16 which contact anode 12 on opposite sides respectively, and first and second cathode layers 18, 20 which contact sides of the electrolyte 14 and 16 that are not in contact with the anode layer. Current collectors 22 and 24 respectively contact the sides of cathode layers 18 and 20 which are not in contact with electrolyte layers. The laminate shown in FIG. 2 is actually a bi-faced structure to maximize the use of anode 12. In one embodiment, anode 12 is a lithium foil, electrolyte layers 14 and 16 comprise a radiation polymerizable compound, the cathode layers 18 and 20 comprise a composite of finely divided vanadium oxide ($V_6O_{13}$), carbon black or an electronically conductive polymer in a solid electrolyte material, and cathode current collecting layers 22 and 24 comprise nickel, stainless steel, aluminum foils, metal coated polymers, or a thin film of polyethylene terephthalate having electrodeposited thereon a layer of nickel metal. Electrolyte layers 14 and 16 may be formed by preparing a mixture of liquid monomeric or pre-polymeric radiation polymerizable compound, a radiation inert ionically conducting liquid, and an ionizable alkali metal salt, which may preferably be a lithium salt.

Before being cured, the cathode layers 18 or 20 typically are in the form of self sustaining paste films. In the invention of this application, the film material is first deposited onto, for example, a substrate layer such as a layer of current collector material and then a cover sheet is used to compress the film material between the anode layer and the cover sheet to make a cathode layer of uniform thickness. Then an electrolyte layer and anode are deposited to form a laminar composite. When the laminar composite is cut to the appropriate size, the substrate becomes the current collectors 22, 24.

The cathode layer may be already cured when an electrolyte material is deposited thereon to become the electrolyte layers 14, 16. In conventional laminar battery manufacturing, the cathode material is deposited onto a substrate such as a current collector sheet. It is found that pin holes are sometimes present in the cathode layer where such holes will remain after the curing process. Then when the electrolyte material is deposited onto the cathode layer, some electrolyte material may penetrate through the pin holes to contact the current collector material. This may cause short circuit between the electrolyte and the current collector sheet which is undesirable. Then when the electrolyte material is deposited onto the cathode layer, the electrolyte layer may again contain pin holes which remain after the curing process, so that when an anode layer is formed on top of the electrolyte layer, a conductive material may be present in the pin holes to cause a short circuit between the anode and the cathode layers through the pin holes. It is therefore desirable to provide for an apparatus and a method of manufacture whereby such pin holes are not formed in the electrolyte or cathode material layers.

Figure 3:
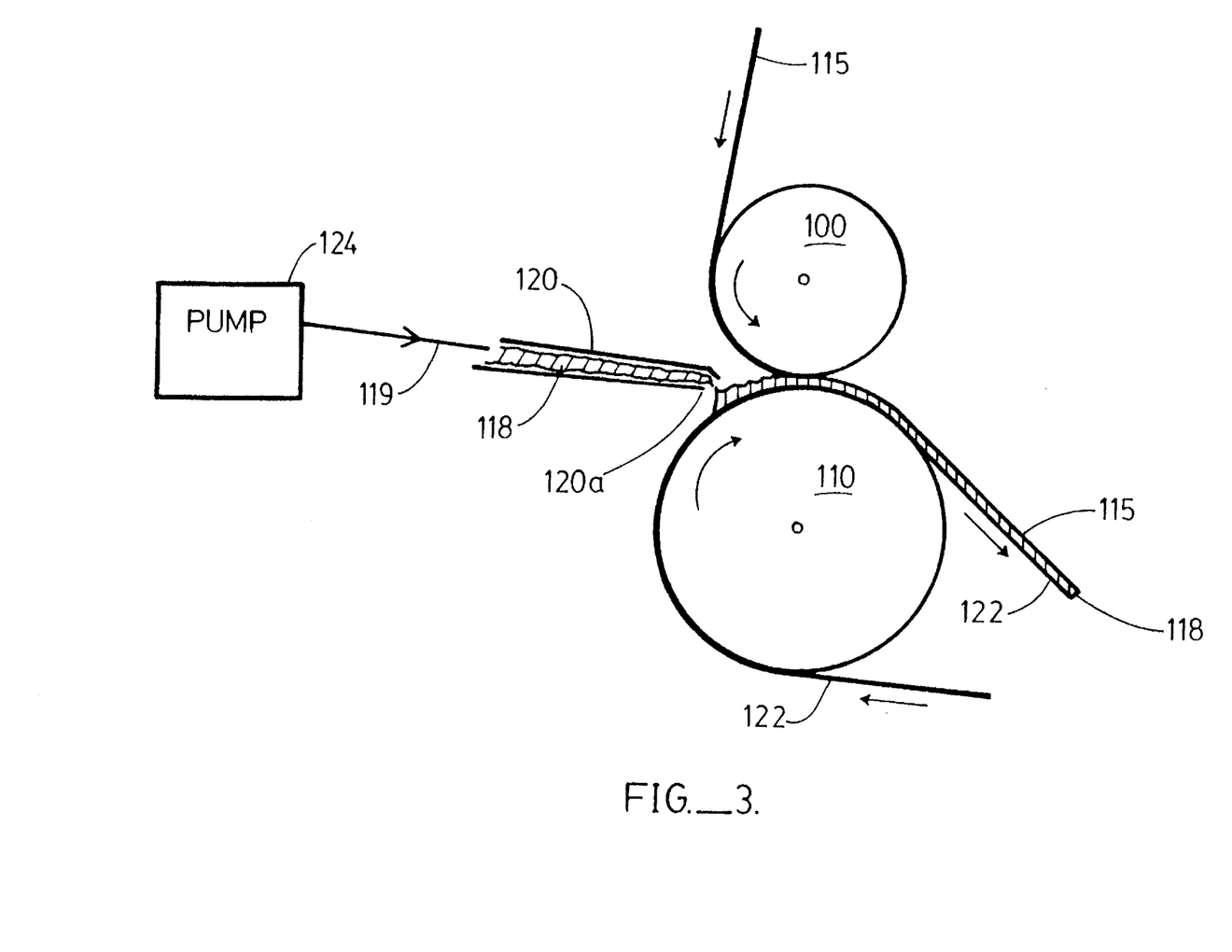
FIG. 3 is a schematic view of an apparatus to illustrate the deposition of a layer of battery electrode material (or electrolyte material) on a substrate and covered by a cover sheet to avoid the presence of pin holes in the layer or to render the surface of the material deposited to have an uneven surface to illustrate the invention.

FIG. 3 is a schematic view illustrating the invention. As shown in FIG. 3, a cathode material 118 is deposited onto a metal sheet or foil 122 which wraps around and is rotated by a cylindrical drum or roller 110. The cathode material 118 is forced by a pump 124 along arrow 119 and delivered through an opening 120*a* in nozzle 120. A cover sheet 115 is wrapped around a drum or roller 100 which rotates to deliver the sheet to come in contact with cathode material 118. The spacing between drums 100 and 110 is such that a desired spacing is left between the cover sheet 115 and metal foil 122 for the cathode material 118 so that a layer of cathode material 118 of the desired thickness is formed and sandwiched between cover sheet 115 and metal foil 122 as shown in FIG. 3. The composite sheet formed having layers 122, 118 and 115 is then formed with layer 118 being of the desired thickness, which may be in a range of about 20 to 200 microns.

The cathode material 118 has a very high viscosity, typically in excess of 300,000 cps. A pump 124 applying a pressure in excess of 200 psi is employed to force such viscous cathode material through opening 120*a* of nozzle 120 onto foil 122. The rotating surfaces of drums or rollers 100, 110 form two pressing surfaces moving in the same direction, where the two pressing surfaces are spaced apart by a predetermined distance which may be in the range of 20–200 microns or more. The action of the two pressing surfaces is to press upon the material 118 onto foil 122 so that the material adheres to foil 122, and also to press the material into a layer with a predetermined thickness with substantially no pin holes therein or protrusions thereon. While in the preferred embodiment, the above pressing action is accomplished by two rollers or drums 100, 110, it will be understood that other pressing surfaces such as two parallel pressing surfaces moving in the same direction may be employed instead; such and other variations are all within the scope of the invention.

In order to form a cathode layer with desired thickness and of a desired width, it is preferable for the cross-sectional area of the opening 120*a* to be the same as the cross-sectional area of the cathode layer that is to be formed, and it is also preferable for the speed of delivery of the cathode material 118 through the opening 120*a* to be the same as the speed of the two pressing surfaces on rollers or drums 100, 110. Thus, if the circumference of drums 100, 110 are moving at, for example, 4 feet per minute, then the cathode material 118 should also be delivered through opening 120*a* also at a speed of 4 feet per minute. The speed of delivery of material 118 can be controlled by a metering source such as a pump 124, by adjusting the pressure of the pump in a manner known to those skilled in the art. The material 118 would then be pressed by the two pressing surfaces into a layer of uniform thickness and width on foil 122.

The above-described system for forming a cathode layer of uniform thickness and width can also be applied to the formation of the electrolyte layer on the cathode layer, or for the formation of an anode layer if the anode layer is to be deposited in the form of a paste. In such event, an electrolyte material or anode material is then squeezed by means of the pump or other metering device through nozzle 120 and opening 120*a* onto a substrate, or onto other layers already formed on a substrate, such as a cathode layer.

Before the electrolyte material is deposited onto the cathode layers, the cover sheet is first removed. In the above embodiment, the cover sheet used has a smooth surface which contacts the electrolyte material. Therefore, after the cover sheet is peeled off, the surface of the cathode layer originally in contact with the cover sheet will also have a smooth surface after the cover sheet is peeled. Therefore, when the electrolyte material is deposited on the smooth surface of the cathode layer to form an electrolyte layer, the electrolyte layer may slip relative to the cathode layer. This will be the case when the cathode has been cured before the electrolyte material is deposited. Such slippage may cause shorts between the anode or cathode layers and one of the two tabs 32, 34. Such shorts will cause the battery to be defective and be discarded. For this reason, it is desirable to provide an improved method of manufacture whereby the slippage between electrolyte layer and the cathode layer is reduced.

Figure 4:
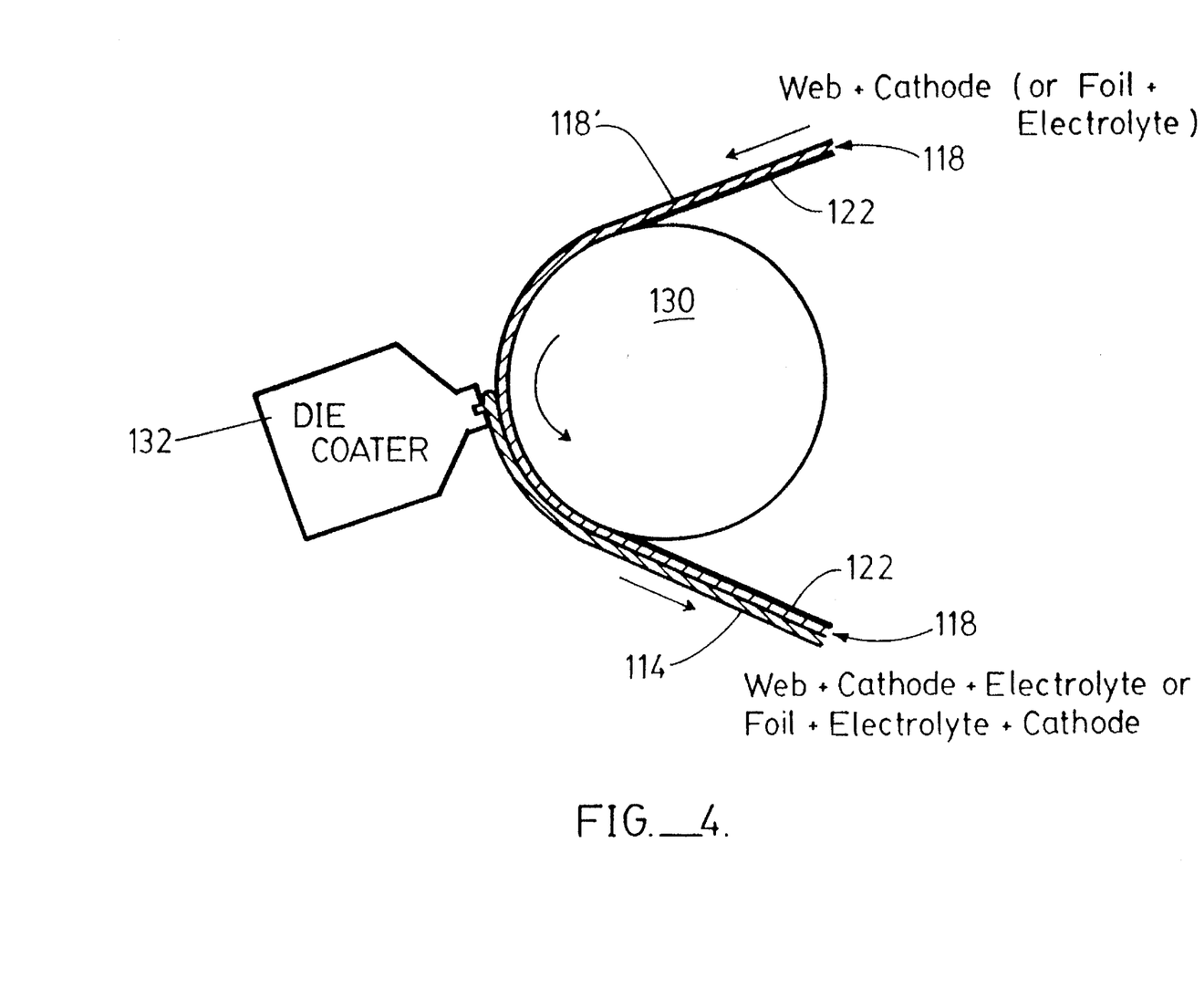
FIG. 4 is a schematic view illustrating how an electrolyte layer is deposited onto a battery electrode layer with an uneven surface (or how a layer of battery electrode material is deposited on an electrolyte layer with an uneven surface) to illustrate the invention.

After the cover sheet 115 is removed, a layer of electrolyte material 114 is deposited onto the cathode layer as illustrated in FIG. 4. As shown in FIG. 4, the foil 122 and cathode layer 118 are rotated by means of drum 130 and a layer of electrolyte material is deposited by a die coater 132 onto the cathode layer to form the electrolyte layer 114 forming a laminar assembly for use in the battery. Thereafter, after an anode layer is incorporated, the multi-layer laminar assembly may be cut or folded and cut and tabs 32 and 34 are attached to form a battery assembly such as that of FIG. 1. In the embodiment described above, where cathode layer 118 has a smooth surface, the electrolyte layer 114 may slide or slip relative to the cathode layer 118 during the subsequent processing such as cutting, folding and other handling. This is the case when cathode layer 118 has been cured before the electrolyte layer 114 is deposited. Such slippage may cause unintentional contacts to develop between an anode or cathode layer or an electrolyte layer with one of the two tabs 32, 34, thereby causing shorts. This is undesirable.

Figure 5:
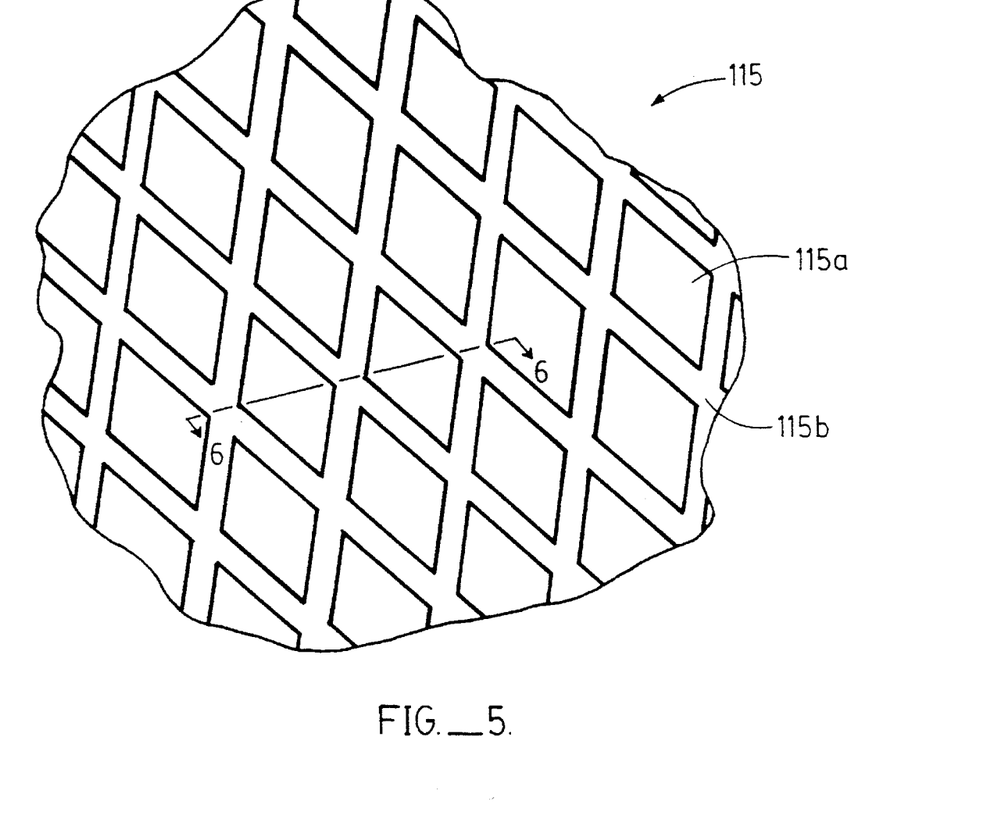
FIG. 5 is the bottom view of a portion of a cover sheet illustrating the uneven patterned bottom surface of the sheet to illustrate the invention.
Figure 6:
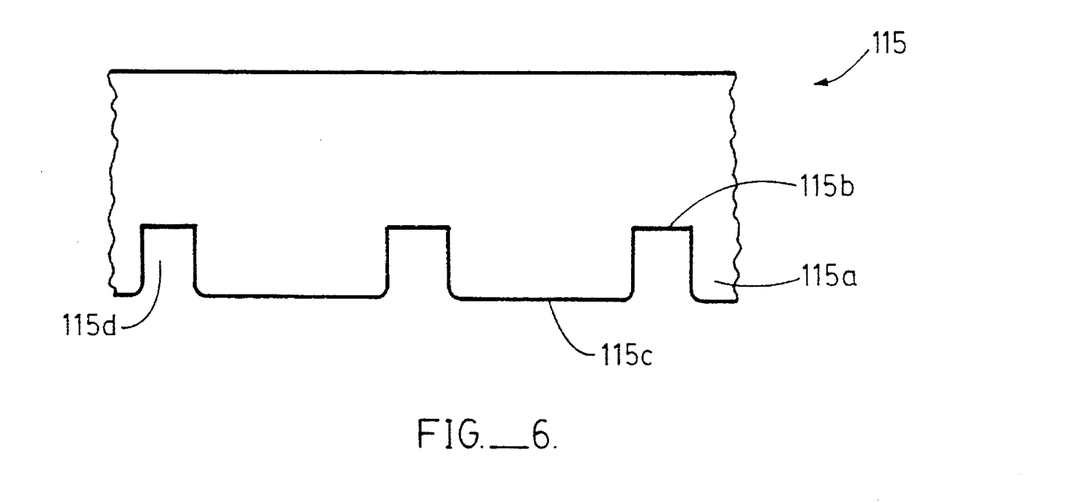
FIG. 6 is a cross-sectional view of a portion of the cover sheet of FIG. 5 along the line 6—6 in FIG. 5.

According to another aspect of the invention, surface 118' of the cathode layer 118 in FIG. 4 is rendered uneven before an electrolyte layer 114 is deposited onto it, so that slippage between the two layers is reduced, thereby also reducing the probability of unintentional contacts and shorting. In the preferred embodiment, this is accomplished by employing a cover sheet that has an uneven surface in the scheme of FIG. 3. FIG. 5 is a top view of a portion of a cover sheet 115 with a patterned uneven surface thereon. A cross-sectional view of the cover sheet 115 along the line 6—6 in FIG. 5 is shown in FIG. 6. As shown in FIGS. 5 and 6, cover sheet 115 has protrusions 115*a* thereon which protrude from surface 115*b* of the cover sheet by a distance preferably in the range of about 1 to 5 microns, where surface 115*b* defines a reference plane. Alternatively, sheet 115 may be viewed as having a surface 115*c* with depressions 115*d* therein where the depressions have a depth preferably in a range of about 1 to 5 microns from surface 115*c* which may also define a reference plane.

Thus, when a side of cover sheet 115 having protrusions/depressions thereon or therein is in contact with cathode layer 118, surface 118' of the cathode layer will have a "mirror image" surface. In other words, surface 118' of the cathode layer will have protrusions in the shape of depressions 115*d* of the cover sheet protruding from the surface of the cathode layer which is defined by surface 115*c* of the cover sheet when the cathode material is squeezed between the metal foil 122 and the cover sheet 115 by means of the two rollers 100 and 110 in FIG. 3. The cathode layer is then cured in a manner known to those skilled in the art. Therefore, when the electrolyte material 114 is deposited onto surface 118' of the cathode layer as shown in FIG. 4, the amount of slippage between the cathode layer 118 and the electrolyte layer 114 is much reduced, thereby also reducing the probability of misalignment in the subsequent cutting and folding process or other handling, and thereby also reducing the probability of developing shorts in the battery.

The resulting laminar assembly delivered by drum 130 comprising a substrate layer 122, a cathode layer 118, and a electrolyte layer 114 is suitable for use in a laminar battery. While in FIGS. 5 and 6, the uneven surface of cover sheet 115 is shown to have a regular pattern of parallelograms, it will be understood that the pattern of the uneven surface need not be regular. As long as the uneven surface of the cover sheet is such as to cause surface 118' of the cathode layer to develop controlled variations of heights of protrusions and depths of depressions of appropriate magnitudes from a reference plane representing the surface, the above-described advantages will be present. All such variations are within the scope of the invention.

It will be noted that, where the cathode layer has an uneven surface, the unevenness is preferably of the order of 1–5 microns whereas the cathode layer itself has a thickness of 20–200 microns. This means that the unevenness of the surface of the cathode layer by itself will not result in pin holes that may also cause short circuit in the laminar battery. The substrate layer such as foil 122 generally has a smooth surface, where the unevenness of the surface is such that protrusions and depressions thereon are less than 2 microns from a reference plane representing the surface of the substrate. Where the cathode layer has a thickness in the range of 20–200 microns, such small unevenness of the foil 122 together with the unevenness of the surface of the cathode layer onto which the electrolyte material is to be deposited, will not cause the electrolyte layer to come into contact with the foil 122 to cause short circuits.

Figure 7:
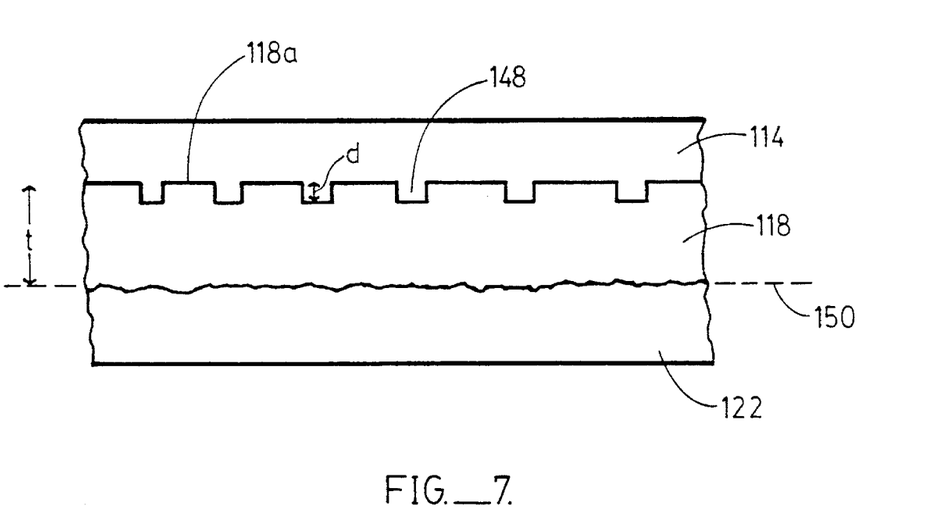
FIG. 7 is a cross-sectional view of a portion of foil 122 and of the cathode and electrolyte layers thereon.

Therefore, the substrate layer such as foil 122 has a substantially flat surface and the battery electrode layer such as a cathode layer is formed with an uneven surface in contact with and extends over the flat surface of the substrate layer, so that the heights of protrusions or depths of depressions from a reference plane representing the uneven surface is less than the average thickness of the battery electrode layer. This is illustrated in FIG. 7. FIG. 7 is a cross-sectional view of a portion of the substrate foil 122 and of the portions of cathode layer 118 and electrolyte layer 114 thereon, where the surface of cathode layer 118 has a patterned uneven surface.

As shown in FIG. 7, while there is some irregular unevenness on the surface of foil 122, such unevenness has small amplitudes so that protrusions and depressions on surface of foil 122 are less than 2 microns from a reference plane 150 representing the surface of foil 122. The depressions on the surface of cathode layer 118 has a depth d from a reference plane 118a representing the surface of layer 118, where d is small compared to the average thickness t of the cathode layer. Thus, if t is at least 20 microns and d is in the range of 1–5 microns, then the depths of the depressions (or heights of protrusions) is small compared to the average thickness of the cathode layer. Preferably, the depth of the depressions 148 on the surface of cathode layer 118 is 25 percent or less of the average thickness t of the cathode layer, so that there is no danger that a short circuit will develop between electrolyte layer 114 and foil 122 despite the small unevenness of the surface of the substrate foil 122 and the depressions 148.

Instead of depositing a layer of electrolyte material onto a cathode layer as described above, it is also possible to manufacture another laminar assembly for use in the battery by first depositing the electrolyte layer onto a substrate such as an anode sheet and thereafter depositing a layer of cathode material on the electrolyte layer. Thus, in reference to FIG. 2, it is possible to first deposit a layer of electrolyte material on the metal foil of anode material, and then deposit the cathode layer onto the electrolyte layer. In such event, the method illustrated in FIG. 3 may be adapted for such process as well. Roller 110 would then deliver a sheet of such anode material and tube 120 would deposit a layer of electrolyte material onto the anode material and cover sheet 115 with a smooth or uneven surface is delivered by roller 100 to compress the electrolyte material to be one of controlled thickness sandwiched between the anode sheet and the cover sheet and so that the electrolyte material will adhere to the anode. Again, the cover sheet 115 used preferably has an uneven surface such as that shown in FIGS. 5 and 6 or other surfaces of controlled variations in thickness, so that the resulting surface of the electrolyte material will also have controlled variations of thickness such as protrusions thereon. Then the apparatus of FIG. 4 may then be used to deposit a layer of cathode material onto the electrolyte layer. The protrusions or depressions on the electrolyte layer surface reduce the slippage between the cathode and electrolyte layers when the layer of cathode material is deposited onto the electrolyte layer as well as during the subsequent cutting, folding and handling process. Therefore, again the probability of developing shorts in the resulting battery is reduced. Preferably, the heights of protrusions and depths of depressions of the uneven electrolyte surface in reference to a reference plane (similar to plane 118a of the cathode layer shown in FIG. 7) representing the surface of the electrolyte layer are less than 25% of the average thickness of the electrolyte layer. Preferably the uneven surface of the electrolyte layer has a patterned surface, where the uneven surface has protrusions and/or depressions of about 1 to 5 microns in height from the reference plane, and wherein the average thickness of the electrolyte layer is greater than 20 microns. By employing the method of the invention, pin holes are also avoided and the electrolyte layer is caused to have a desired thickness and to adhere to the anode layer.

If the anode of the laminar assembly to be formed was originally in the form of a paste, the above-described pin hole or slippage problems can also develop at the interface between the anode layer and the electrolyte layer. In such event, the above-described process may again be used whether the electrolyte layer is to be deposited onto the anode layer or vice versa. In either case, the layer which is to be deposited first is formed using a cover sheet 115 with a smooth or uneven surface of the type shown in FIGS. 5, 6 or of other design so as to again reduce the slippage between the anode layer and the electrolyte layer. Such and all other variations are within the scope of the invention.

The invention has been described above by reference to various embodiments. It will be understood that different changes and modifications may be made without departing from the scope of the invention which is to be limited only by the appended claims.

What is claimed is:

1. A method for making a structure for use in a laminar battery assembly, comprising:
   (a) depositing a layer of battery electrode material on a surface of a substrate layer;
   (b) causing said material to have an uneven surface;
   (c) curing said battery electrode material; and
   (d) after step 1(b), depositing a layer of electrolyte material on the uneven surface of the battery electrode material layer.

2. The method of claim 1, wherein the battery electrode material is in the form of a paste and the depositing step deposits the battery electrode paste material on the substrate layer.

3. The method of claim 1, said causing step including pressing said battery electrode material with a cover sheet with an uneven surface in contact with the battery electrode material.

4. The method of claim 3, wherein step (a) deposits said battery electrode material onto a substrate layer, and wherein said step (b) includes the step of causing the cover sheet to come into contact with the battery electrode material so that the cover sheet is at a set distance from the substrate layer in order to form the layer of battery electrode material with an uneven surface.

5. The method of claim 4, said method further comprising rotating two rollers, wrapping said substrate layer around one of the rollers and the cover sheet around the other of the rollers so that the substrate and the cover sheet are caused to move in the same direction by the rollers, the rollers being spaced apart at such distance that the cover sheet is at said set distance from the substrate.

6. A method for making a structure for use in a laminar battery assembly, comprising:

(a) depositing a layer of electrolyte material on a surface of a substrate layer;

(b) causing said material to have an uneven surface; and (c) after step 1(b), depositing a layer of battery electrode material on the uneven surface of the electrolyte material layer.

7. The method of claim 6, further comprising the step of curing said electrolyte material prior to step (c).

8. The method of claim 6, wherein the electrolyte material is in the form of a paste and the depositing step deposits the electrolyte paste material on the substrate layer.

9. The method of claim 6, said causing step including pressing said electrolyte material with a cover sheet with an uneven surface in contact with the electrolyte material.

10. The method of claim 9, wherein step (a) deposits said electrolyte material onto a rotating substrate layer, and wherein said step (b) includes the step of rotating the cover sheet into contact with the electrolyte material so that the cover sheet is at a set distance from the substrate layer in order to form the layer of electrolyte layer with an uneven surface.

11. The method of claim 10, said method further comprising rotating two rollers, wrapping said substrate layer around one of the rollers and the cover sheet around the remaining roller so that the substrate and the cover sheet are caused to move in the same direction by rotation of the rollers, the rollers being spaced apart at such distance that the cover sheet is at said set distance from the substrate.

12. A method for making a structure for use in a laminar battery assembly, comprising the steps of:

forcing a viscous battery material through an opening onto a surface of a substrate layer; and passing the viscous material and the substrate layer through two pressing surfaces moving in the same direction, said two pressing surfaces spaced apart by a set distance so that the viscous material is pressed into a layer with a set thickness with substantially no pin holes therein, and so that the material adheres to the substrate surface, the passing step including rotating two rollers at said set distance from each other, the pressing surfaces being surfaces of the rollers, said set distance in a range of about 20 to 200 microns.

13. The method of claim 12, further comprising the step of pressing a cover sheet onto the material and between the two pressing surfaces, so that the material is sandwiched between the substrate and the cover sheet.

14. The method of claim 13, said passing step including the step of wrapping the substrate layer around one of the rollers and the cover sheet around the remaining roller, and wherein said forcing step deposits the material onto the substrate surface at a location so that rotation of the rollers causes the material to pass between the two rollers to form a layer.

15. The method of claim 12, said forcing step being applied at a pressure in excess of 200 psi.

16. The method of claim 12, said forcing step is such that a cathode material paste is forced through the opening onto the surface of the substrate layer.

17. The method of claim 12, said forcing step is such that the viscous material has a viscosity greater than 300,000 cps.

* * * * *